(12) United States Patent
Jikuhara et al.

(10) Patent No.: US 12,260,367 B2
(45) Date of Patent: Mar. 25, 2025

(54) INFORMATION PROCESSING DEVICE, DELIVERY SYSTEM, AND INFORMATION PROCESSING METHOD

(71) Applicant: TOYOTA JIDOSHA KABUSHIKI KAISHA, Aichi-ken (JP)

(72) Inventors: Yoshikazu Jikuhara, Miyoshi (JP); Jun Hioki, Nagakute (JP); Kaori Yamada, Nagakute (JP); Maiko Watanabe, Nagoya (JP); Yuki Kuwayama, Yokohama (JP); Shunya Maruta, Tokyo (JP); Yo Okumura, Chofu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/344,802

(22) Filed: Jun. 29, 2023

(65) Prior Publication Data
US 2024/0013136 A1    Jan. 11, 2024

(30) Foreign Application Priority Data
Jul. 5, 2022    (JP) .................................. 2022-108599

(51) Int. Cl.
*G06Q 10/0835*    (2023.01)
(52) U.S. Cl.
CPC ................................. *G06Q 10/0835* (2013.01)
(58) Field of Classification Search
CPC .................................................. G06Q 10/0835
See application file for complete search history.

(56) References Cited

U.S. PATENT DOCUMENTS 11,379,784 B1 *   7/2022   Eastman ............... G06Q 10/083
11,935,347 B1 *   3/2024   Philbrick ............... G05D 1/104
2015/0379468 A1 * 12/2015  Harvey ............ G06Q 10/08355
                                                            705/338

(Continued)

FOREIGN PATENT DOCUMENTS

DE    102016009572 A1    11/2017
GB         2573382 A     11/2019

(Continued)

OTHER PUBLICATIONS

Matt Webster, Toward Reliable Autonomous Robotic Assistants Through Formal Verification: A Case Study, 2015, p. 186-188 (Year: 2015).*

*Primary Examiner* — Ibrahim N El-Bathy
(74) *Attorney, Agent, or Firm* — HAUPTMAN HAM, LLP

(57) ABSTRACT

The information processing device of the present disclosure is included in a delivery system that delivers a package delivered to an intermediate delivery point in a specific area to a final delivery destination in the specific area. The information processing device includes a control unit that determines a logistics robot that delivers a package from an intermediate delivery point to a final delivery destination, and performs a process of acquiring or generating authentication information for confirming authenticity of the logistics robot and that is used when the logistics robot receives a package from a vehicle that has delivered the package to an intermediate delivery point, and transmitting the authentication information to a vehicle-side system before the logistics robot receives the package.

18 Claims, 8 Drawing Sheets

(56) References Cited

U.S. PATENT DOCUMENTS

| | | | |
|---|---|---|---|
| 2018/0205682 A1* | 7/2018 | O'Brien, V | H04L 51/10 |
| 2019/0102730 A1* | 4/2019 | Giorgi | H04W 4/70 |
| 2021/0241228 A1 | 8/2021 | Tazume | |
| 2021/0387808 A1* | 12/2021 | Kalouche | G06Q 10/083 |
| 2022/0197306 A1* | 6/2022 | Cella | G06N 3/088 |
| 2022/0207472 A1* | 6/2022 | Hashisho | B64C 39/024 |
| 2023/0004933 A1* | 1/2023 | Heinla | G06Q 10/0833 |

FOREIGN PATENT DOCUMENTS

| | | |
|---|---|---|
| JP | 2019-109847 A | 7/2019 |
| JP | 2022-035303 A | 3/2022 |
| WO | 2020/079785 A1 | 4/2019 |

* cited by examiner

INFORMATION PROCESSING DEVICE, DELIVERY SYSTEM, AND INFORMATION PROCESSING METHOD

CROSS-REFERENCE TO RELATED APPLICATION

This application claims priority to Japanese Patent Application No. 2022-108599 filed on Jul. 5, 2022 incorporated herein by reference in its entirety.

BACKGROUND

1. Technical Field

The present disclosure relates to an information processing device, a delivery system, and an information processing method.

2. Description of Related Art

In recent years, a technique related to a delivery by a logistics robot (small robot vehicle) has been studied. For example, US 2015/0379468 A discloses a technique for delivering a parcel in two stages. A first vehicle is designed for operation in a public road system and delivers the parcel to a transfer point based on address information from a carrier. Next, the parcel is then transferred to a second vehicle for delivery to a final delivery point. The second vehicle is autonomous and suitable for use in a location remote from the public road or in a narrow location. One or more second vehicles complete delivery of the parcel to the final delivery point based on detailed information of a delivery segment provided from a location controller of the area.

SUMMARY

When the technique described in US 2015/0379468 is applied to delivery of a package to a specific area, such as a housing complex or a gated residential area, a transfer point (corresponding to an "intermediate delivery point" of the present disclosure described below) is a dedicated delivery location for the area, such as a temporary standby location of the housing complex or a driveway. In this case, a mode is assumed in which the carrier is responsible for the delivery to the transfer point, and the administrator of the area is responsible for the delivery from the transfer point to the final delivery point (corresponding to the "final delivery destination" of the present disclosure described below). However, there is a concern that, when a third party other than the carrier, the administrator of the area, and the recipient of the package illegally obtains the delivery information of the package at the transfer point, a second vehicle (corresponding to the "logistics robot" of the present disclosure described below) that is the counterfeit is dispatched to the transfer point and the package to be delivered is illegally taken away.

In view of such circumstances, an object of the present disclosure is to improve the safety of delivery of a package.

An information processing device according to an embodiment of the present disclosure is an information processing device included in a delivery system in which a package delivered to an intermediate delivery point in a specific area is delivered to a final delivery destination in the specific area, and includes a control unit that executes processes to determine the logistics robot that delivers the package from the intermediate delivery point to the final delivery destination, acquire or generate authentication information for confirming authenticity of the logistics robot and that is used when the logistics robot receives the package from a vehicle that delivers the package to the intermediate delivery point, and transmit the authentication information to a vehicle-side system of the vehicle before the logistics robot receives the package.

A delivery system according to an embodiment of the present disclosure is a delivery system in which a package delivered to an intermediate delivery point in a specific area is delivered to a final delivery destination in the specific area, and includes: a vehicle that delivers the package to the intermediate delivery point; a logistics robot; and an information processing device. The information processing device includes a control unit that executes processes to determine the logistics robot that delivers the package from the intermediate delivery point to the final delivery destination, acquire or generate authentication information for confirming authenticity of the logistics robot and that is used when the logistics robot receives the package from the vehicle that delivers the package to the intermediate delivery point, and transmit the authentication information to a vehicle-side system of the vehicle before the logistics robot receives the package.

Further, an information processing method according to an embodiment of the present disclosure is an information processing method executed by a control unit of an information processing device included in a delivery system in which a package delivered to an intermediate delivery point in a specific area is delivered to a final delivery destination in the specific area, and includes: a process of determining a logistics robot that delivers the package from the intermediate delivery point to the final delivery destination; a process of acquiring or generating authentication information for confirming authenticity of the logistics robot and that is used when the logistics robot receives the package from a vehicle that delivers the package to the intermediate delivery point; and a process of transmitting the authentication information to a vehicle-side system of the vehicle before the logistics robot receives the package.

According to the present disclosure, it is possible to improve the safety of the delivery of the package.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
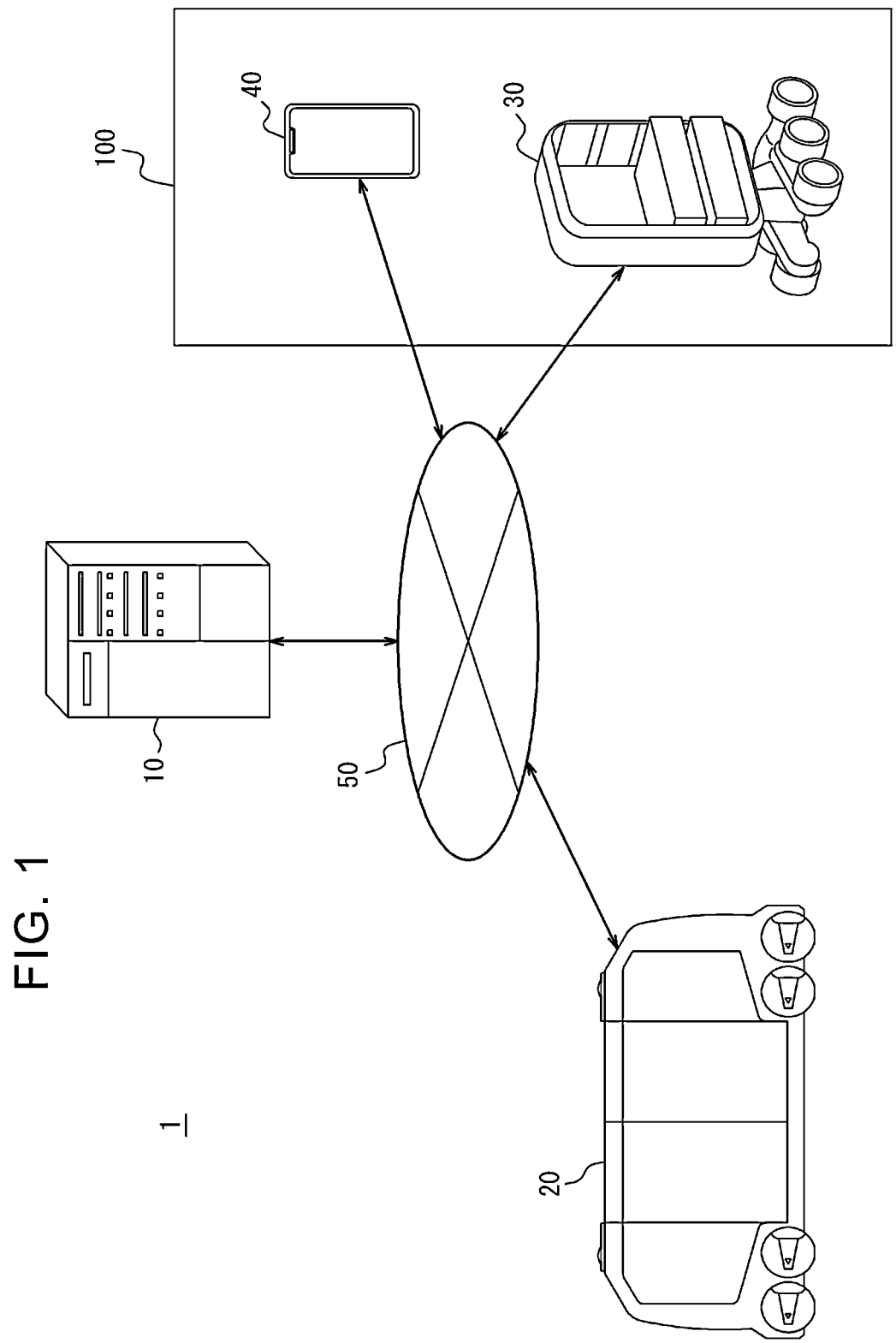
FIG. 1 is a block diagram illustrating a schematic configuration of a system according to an embodiment of the present disclosure.

Hereinafter, an embodiment of the present disclosure will be described below with reference to the drawings. Note that the drawings used in the following description are schematic. Dimensions, ratios, and the like in the drawings do not necessarily coincide with actual ones.

Outline of Embodiment

FIG. 1 is a block diagram illustrating a schematic configuration of a delivery system 1 according to an embodiment of the present disclosure. The delivery system 1 includes an information processing device 10, a vehicle 20, a logistics robot 30, and a terminal device 40. The information processing device 10, the vehicle 20, the logistics robot and the terminal device 40 are communicably connected to a network 50 including, for example, the Internet and a mobile communication network.

In FIG. 1, for convenience of explanation, one information processing device 10, a vehicle 20, a logistics robot 30, and a terminal device 40 included in the delivery system 1 are illustrated, but the number is not limited thereto. The delivery system 1 may include two or more information processing devices 10. The number of the vehicles 20, the logistics robots 30, and the terminal devices 40 included in the delivery system 1 may be two or more, and may be arbitrarily determined.

The logistics robot 30 and the terminal device 40 may be disposed in the housing complex 100. The housing complex is included in a specific area to which delivery by the delivery system 1 of the present disclosure is applied. Other examples of specific areas include residential areas, office buildings, hospitals, factories, schools, and the like in which people and vehicles are controlled from outside, such as a so-called "gated community."

The information processing device 10 is, for example, a computer such as a server apparatus. For example, the information processing device 10 is a server belonging to a cloud computing system or another computing system. Note that the information processing device 10 is not limited thereto, and may be any general-purpose electronic device such as a Personal Computer (PC, or may be another electronic device dedicated to the delivery system 1. The information processing device 10 is capable of communicating with the vehicle 20, the logistics robot 30, and the terminal device 40 via the network 50. In the present embodiment, the information processing device 10 manages the operation of the logistics robot 30 and the delivery of the package in the housing complex 100 by the logistics robot 30. The information processing device 10 may be disposed in the housing complex 100 as well as the logistics robot 30, but may be disposed outside the housing complex 100.

The vehicle 20 is, for example, an automobile, but is not limited thereto, and may be any vehicle. Motor vehicles include, but are not limited to, for example, gasoline-powered vehicles, battery electric vehicle (BEV; Battery Electric Vehicle), hybrid electric vehicle (HEV; Hybrid Electric Vehicle), plug-in hybrid electric vehicle (PHEV; Plug-in Hybrid Electric Vehicle), or fuel cell electric vehicle (FCEV; Fuel Cell Electric Vehicle). In addition, the vehicle 20 may be a manned vehicle or an arbitrary autonomous driving vehicle that travels unmanned.

In the present embodiment, the vehicle 20 has a function of traveling on a public road, delivering a package to be delivered to an intermediate delivery point, and delivering the package to the logistics robot 30. Here, the intermediate delivery point is a place where a package is delivered from the vehicle 20 to the logistics robot 30, and specifically, is a standby place of the logistics robot 30 in the housing complex or an intermediate collection and delivery place for delivery.

Logistics robot 30 is a robot that delivers packages autonomously and unattended. The logistics robot 30 may include, for example, any delivery vehicle that moves between points by autonomous driving, and may be positioned as a second vehicle with respect to the vehicle 20. The logistics robot 30 may be an in-building logistics robot that is permanently installed in a delivery destination housing complex (a condominium, an apartment, or the like) and specializes in delivering a package to each dwelling unit in the housing complex. Further, the logistics robot 30 is not limited to a vehicle, and may be a humanoid robot or an arbitrary flying object (drone) that flies autonomously.

The logistics robot 30 autonomously delivers the package to at least one final delivery destination. Upon arriving at the final delivery destination, the logistics robot 30 delivers the package addressed to the recipient of the final delivery destination to the recipient. When the recipient of the delivery destination cannot directly deliver the package to the recipient due to the absence or the like, the logistics robot 30 can perform other operations as necessary, such as transporting the package to the instructed place.

The terminal device 40 is any electronic device used by a recipient who receives a package. For example, a general-purpose electronic device such as a PC, a smart phone, or a tablet terminal, or a dedicated electronic device can be used as the terminal device 40.

First, the outline of the present embodiment will be described, and the details will be described later. Upon receiving the delivery schedule information indicating the delivery schedule of the package from the vehicle 20 that carries the package, the information processing device 10 determines the logistics robot 30 that delivers the package to the final delivery destination. The final delivery destination is, for example, a dwelling unit of a resident of the housing complex 100. The information processing device 10 transmits an instruction to receive a package to the determined logistics robot 30. Further, the information processing device 10 transmits authentication information, which is information for confirming the authenticity of the logistics robot 30, to the vehicle 20. The authentication information is, for example, identification information (logistics robot ID) given to the logistics robot 30. The vehicle 20 delivers the package to the logistics robot 30 that has checked the authenticity by checking the authentication information at the intermediate delivery point. In the present disclosure, "authenticity" means that an object is authentic. The "authenticity" of the logistics robot 30 means that the logistics robot 30 is the correct logistics robot 30 determined for delivering the target package.

As described above, according to the present embodiment, the vehicle 20 delivers the cargo to the logistics robot 30 whose authenticity is confirmed, and does not deliver the cargo to the logistics robot 30 whose authenticity is not confirmed. As a result, it is possible to reduce the risk that the third party's logistics robot is illegally delivered, and to improve the safety of the delivery of the package. Therefore, safety and reliability of the entire delivery system 1 using the logistics robot 30 are improved.

Next, each configuration of the delivery system 1 will be described in detail.

Configuration of Information Processing Device

Figure 2:
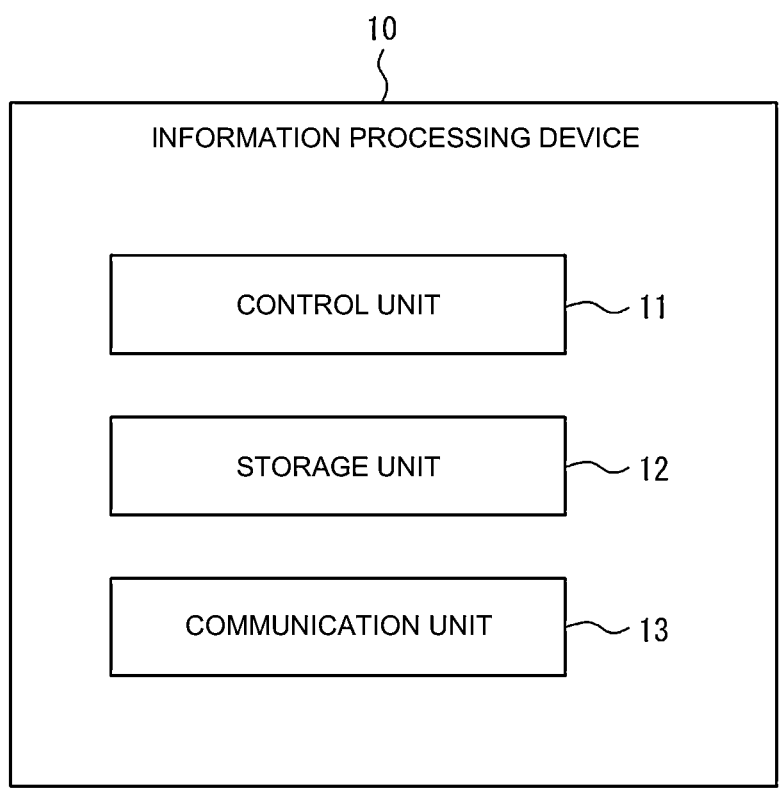
FIG. 2 is a block diagram illustrating a schematic configuration of an information processing device.

As illustrated in FIG. 2, the information processing device 10 includes a control unit 11, a storage unit 12, and a communication unit 13.

The control unit 11 includes at least one processor, at least one dedicated circuit, or a combination thereof. A processor may be a general-purpose processor such as central processing unit (CPU) or graphics processing unit (GPU), or a special-purpose processor specialized for a particular process. The dedicated circuitry is, for example, field programmable gate array (FPGA) or application specific integrated circuit (ASIC). The control unit 11 executes processing related to the operation of the information processing device 10 while controlling each unit of the information processing device 10.

The storage unit 12 includes at least one semiconductor memory, at least one magnetic memory, at least one optical memory, or a combination of at least two types thereof. Semiconductor memories are, for example, random access memory (RAM) or read only memory (ROM). RAM is, for example, static random access memory (SRAM) or dynamic random access memory (DRAM). ROM is, for example, electrically erasable programmable read only memory (EEPROM). The storage unit 12 may function as, for example, a main storage device, an auxiliary storage device, or a cache memory. The storage unit 12 stores programs and data used for the operation of the information processing device 10 and data obtained by the operation of the information processing device 10. The information stored in the storage unit 12 may be updatable by, for example, information acquired from the network 50 via the communication unit 13.

The communication unit 13 includes at least one external communication interface connected to the network 50. The communication interface may be either a wired communication or a wireless communication interface. For wired communication, the communication interface is, for example, Local Area Network (LAN) interface, Universal Serial Bus (USB). For wireless communication, the communication interface is an interface compatible with a mobile communication standard such as Long Term Evolution (LTE), 4th generation (4G), or 5th generation (5G, or an interface compatible with short-range wireless communication such as Bluetooth (registered trademark). The communication unit 13 receives data used for the operation of the information processing device 10, and transmits data obtained by the operation of the information processing device 10 to the outside (for example, the logistics robot 30 and the terminal device 40).

Note that the information processing device 10 in FIG. 2 of the present embodiment does not describe an input unit and an output unit, but may further include an input unit and an output unit. That is, in addition to receiving (inputting) and transmitting (outputting) information via the communication unit 13, information may be input and output by an input unit and an output unit included in the information processing device 10.

The function of the information processing device 10 is realized by executing the program according to the information processing method of the present embodiment by a processor corresponding to the control unit 11. That is, the functions of the information processing device 10 are realized by software. The program causes the computer to execute the operation of the information processing device 10, thereby causing the computer to function as the information processing device 10. That is, the computer functions as the information processing device 10 by executing the operation of the information processing device 10 in accordance with the program.

In the present embodiment, the program can be recorded in a computer-readable recording medium. The computer-readable recording medium includes a non-transitory computer-readable medium such as a magnetic recording device, an optical disc, a magneto-optical recording medium, or a semiconductor memory. Distribution of the program is performed, for example, by selling, transferring, or lending a portable recording medium such as a digital versatile disc (DVD) or a compact disc read only memory (CD-ROM in which the program is recorded. Further, the program may be distributed by storing the program in the storage of the external server and transmitting the program from the external server to another computer. Further, the program may be provided as a program product.

Configuration of Vehicle

Figure 3:
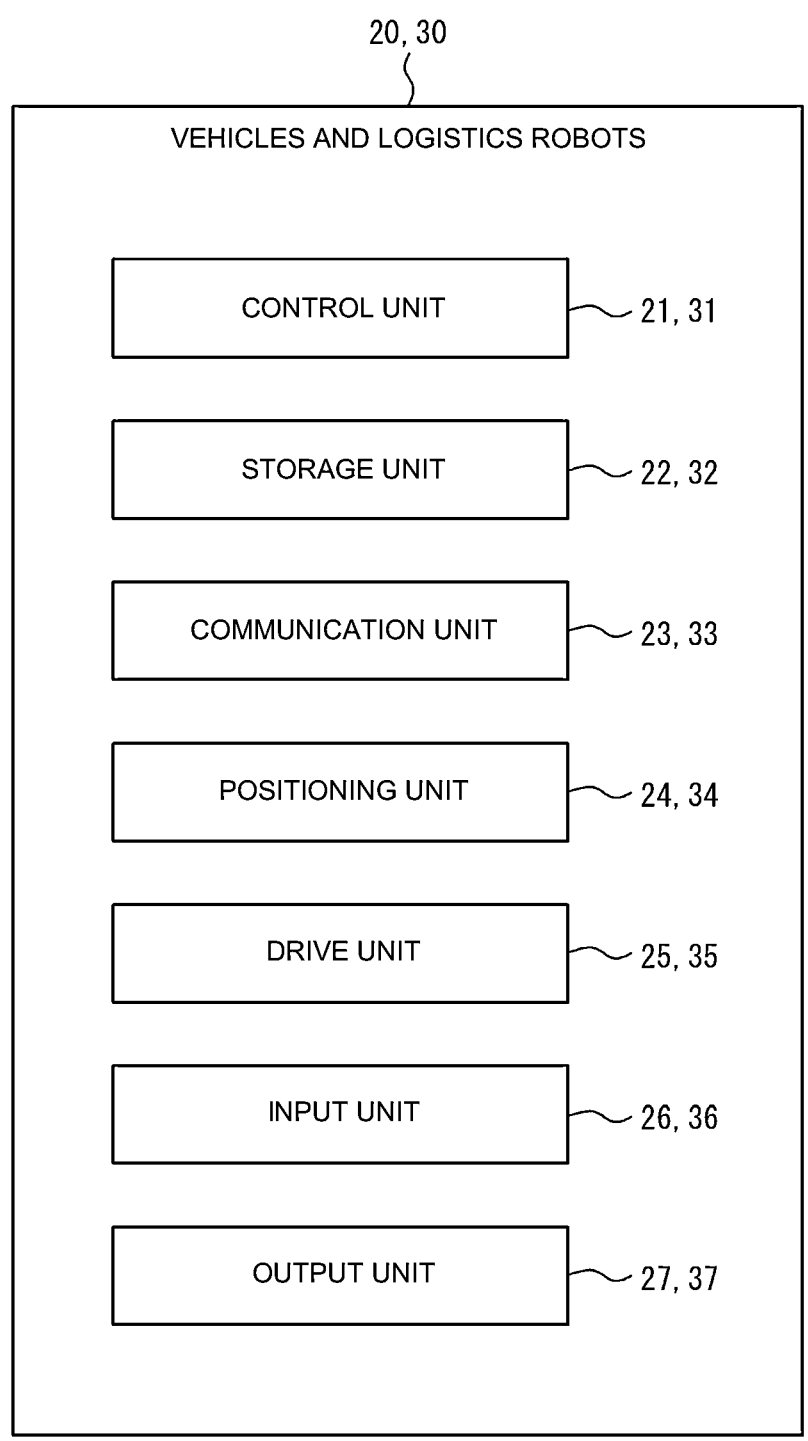
FIG. 3 is a block diagram illustrating a schematic configuration of a vehicle and a logistics robot.

As illustrated in FIG. 3, the vehicle 20 includes a control unit 21, a storage unit 22, a communication unit 23, a positioning unit 24, a drive unit 25, an input unit 26, and an output unit 27. The control unit 21, the storage unit 22, the communication unit 23, the positioning unit 24, the drive unit 25, the input unit 26, and the output unit 27 are included in a vehicle-side system. Since the configurations of the vehicle 20 and the logistics robot 30 are the same, the same drawings are used to describe both the configurations.

The control unit 21 includes at least one processor, at least one dedicated circuit, or a combination thereof. The processor is a general-purpose processor such as a CPU or a GPU, or a dedicated processor specialized for a specific process. The dedicated circuit is, for example, an FPGA or an ASIC. The control unit 21 executes processing related to the operation of the vehicle 20 while controlling each unit of the vehicle 20.

The storage unit 22 includes one or more memories. The memories are, for example, a semiconductor memory, a magnetic memory, or an optical memory, but are not limited to these memories. Each memory included in the storage unit 22 may function as, for example, a main storage device, an auxiliary storage device, or a cache memory. The storage unit 22 stores any information used for the operation of the vehicle 20. For example, the storage unit 22 may store a system program, an application program, and embedded software. Further, for example, the storage unit 22 may store identification information of a package being delivered, information of an intermediate delivery point, information of a final delivery destination, map information of a surrounding road, and the like. The information stored in the storage unit 22 may be updatable by, for example, information acquired from the network 50 via the communication unit 23.

The communication unit 23 includes at least one external communication interface connected to the network 50. The communication interface is, for example, an interface compliant with a mobile communication standard such as LTE, 4G or 5G, or an interface compliant with near field communication such as Bluetooth (registered trademark), but is not limited thereto. The communication unit 23 receives data used for the operation of the vehicle 20, and transmits data obtained by the operation of the vehicle 20 to the outside (for example, the information processing device 10). The communication unit 23 may further include a communication interface for performing short-range wireless communication with the logistics robot 30. Near field communication includes Near Field Communication (NFC), Bluetooth, and Infrared Data Association (IrDA).

The positioning unit 24 includes one or more devices that acquire position information of the vehicle 20. Specifically, the positioning unit 24 includes, for example, a receiver corresponding to Global Positioning System (GPS), but is not limited thereto, and may include a receiver corresponding to any satellite-based positioning system. The positioning unit 24 may constantly acquire the position information of the vehicle 20, or may periodically or non-periodically acquire the position information.

The drive unit 25 includes a driving mechanism for moving and traveling of the vehicle 20. The drive unit 25 also includes any drive mechanism that enables loading of a package on the vehicle 20, transfer of a package loaded on the vehicle 20 to the logistics robot 30, and unloading of a package loaded on the vehicle 20 to a designated location. For example, the drive unit 25 includes at least one of an arm mechanism driven by a motor and a slide mechanism capable of linearly sliding a package. Further, the drive unit 25 may include a driving mechanism that opens and closes, locks, and the like the door of the luggage compartment of the vehicle 20.

The input unit 26 includes means for inputting information to the vehicle 20. For example, the input unit 26 includes any imaging module capable of imaging the surroundings of the vehicle 20. The imaging module includes one or more cameras, each of which is positioned at an appropriate position of the vehicle 20 to enable imaging of the surroundings of the vehicle 20. The input unit 26 may include a voice recognition function together with a voice information input unit. Without being limited thereto, the input unit 26 may include any means for acquiring information about the surroundings of the vehicle 20.

The output unit 27 includes at least one output interface. The output interface is, for example, a display for outputting information in video, a speaker for outputting information in audio, or the like. Displays are, for example, liquid crystal display (LCD) or organic electro luminescence (EL) displays. The output unit 27 displays and outputs data received from the information processing device 10, data obtained by the operation of the vehicle 20, and the like.

Configuration of Logistics Robot

As illustrated in FIG. 3, the logistics robot 30 includes a control unit 31, a storage unit 32, a communication unit 33, a positioning unit 34, a drive unit 35, an input unit 36, and an output unit 37. Since the configuration of the logistics robot 30 is basically the same as that of the vehicle 20, the description will be made using the same drawings, and the description of the overlapping configuration will be simplified.

The control unit 31 includes at least one processor, at least one dedicated circuit, or a combination thereof. The processor is a general-purpose processor such as a CPU or a GPU, or a dedicated processor specialized for a specific process. The control unit 31 executes processing related to the operation of the logistics robot 30 while controlling each unit of the logistics robot 30.

The storage unit 32 includes one or more memories. The memory is, for example, a semiconductor memory, a magnetic memory, an optical memory, or the like. Each memory included in the storage unit 32 may function as, for example, a main storage device, an auxiliary storage device, or a cache memory. The storage unit 32 stores arbitrary information used for the operation of the logistics robot 30. For example, the storage unit 32 may store a system program, an application program, embedded software, and the like. Further, the storage unit 32 may store two-dimensional or three-dimensional map information on the premises of the housing complex 100 and identification information of the logistics robot 30 itself. The information stored in the storage unit 32 may be updatable by, for example, information acquired from the network 50 via the communication unit 33.

The communication unit 33 includes at least one external communication interface connected to the network 50. The communication interface is, for example, an interface compliant with a mobile communication standard such as LTE, 4G or 5G, or an interface compliant with near field communication such as Bluetooth (registered trademark), but is not limited thereto. The communication unit 33 receives data used for the operation of the logistics robot 30, and transmits data obtained by the operation of the logistics robot 30 to the outside (for example, the information processing device 10). The communication unit 33 may further include a communication interface for performing short-range wireless communication with the vehicle 20. Near field communication includes Near Field Communication (NFC), Bluetooth, and Infrared Data Association (IrDA).

The positioning unit 34 includes one or more devices that acquire position information of the logistics robot 30. Specifically, the positioning unit 34 includes, for example, a receiver corresponding to GPS, but is not limited thereto. The positioning unit 34 may include a receiver of a beacon signal from a beacon oscillator disposed indoors, an acceleration sensor, an angular velocity sensor, and the like in order to perform positioning inside the housing complex 100. Further, the positioning unit 34 may use a camera of the input unit 36, which will be described later, and perform positioning based on the three-dimensional map in the housing complex 100 stored in the storage unit 32 and the image acquired by the camera. The positioning unit 34 may constantly acquire the position information of the logistics robot 30, or may periodically or non-periodically acquire the position information.

The drive unit 35 includes a drive mechanism related to movement and travel of the logistics robot 30. The drive unit 35 also includes any drive mechanism that enables loading of a package on the logistics robot 30, delivery of a package loaded on the logistics robot 30 to a recipient, and unloading of a package loaded on the logistics robot 30 to a designated location. For example, the drive unit 35 includes at least one of an arm mechanism driven by a motor and a slide mechanism capable of linearly sliding a package.

The input unit 36 includes a means for inputting information to the logistics robot 30. For example, the input unit 36 includes any imaging module capable of imaging the surroundings of the logistics robot 30. The imaging module includes one or more cameras, and each camera is positioned at an appropriate position of the logistics robot 30 so as to be able to image the surroundings of the logistics robot 30. In addition, the imaging module preferably has the capability of reading the indication of the final delivery destination attached to the package. The input unit 36 may include a voice recognition function together with a voice information input unit. Without being limited to this, the input unit 36 may include any means for acquiring information around the logistics robot 30.

The output unit 37 includes at least one output interface. The output interface is, for example, a display for outputting information in video, a speaker for outputting information in audio, or the like. The display is, for example, an LCD or an organic EL display. The output unit 37 displays data received from the information processing device 10, data stored in the logistics robot 30, data obtained by the operation of the logistics robot 30, or the like, for example, to the recipient or outputs sound.

Configuration of Terminal Device

Figure 4:
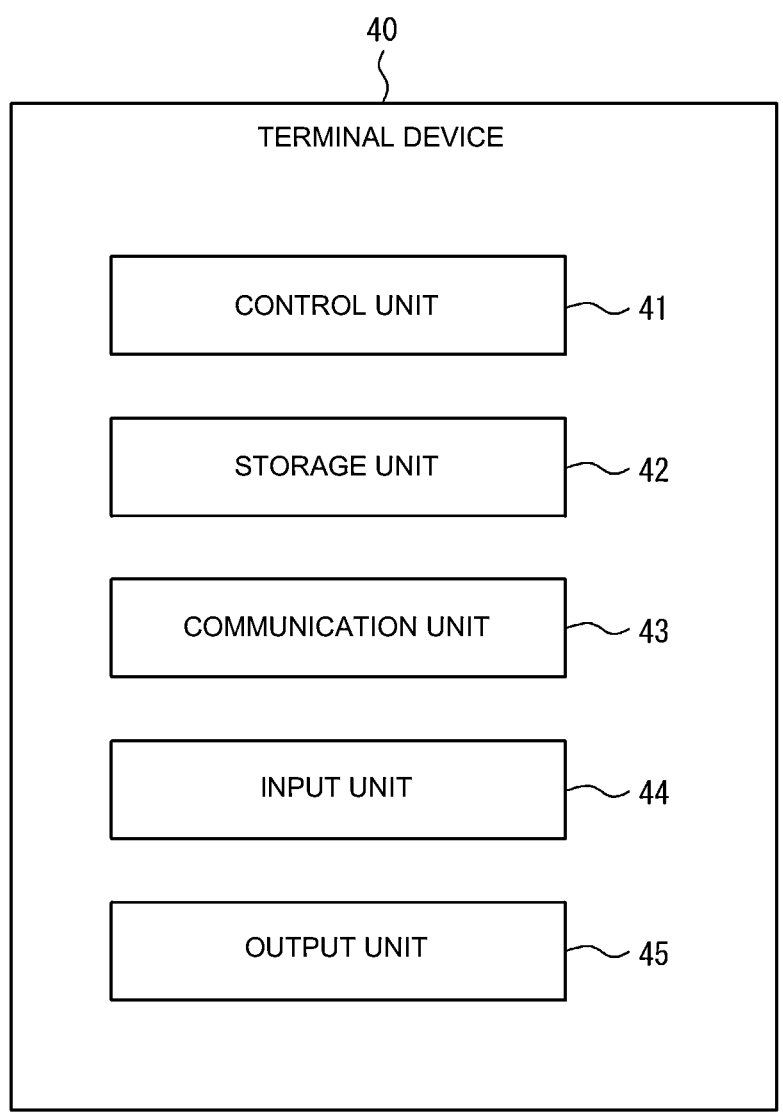
FIG. 4 is a block diagram illustrating a schematic configuration of a terminal device.

As illustrated in FIG. 4, the terminal device 40 includes a control unit 41, a storage unit 42, a communication unit 43, an input unit 44, and an output unit 45.

The control unit 41 includes at least one processor, at least one dedicated circuit, or a combination thereof. The processor is a general-purpose processor such as a CPU or a GPU, or a dedicated processor specialized for a specific process. The dedicated circuit is, for example, an FPGA or an ASIC. The control unit 41 performs processing related to the operation of the terminal device 40 while controlling the units of the terminal device 40.

The storage unit 42 includes at least one semiconductor memory, at least one magnetic memory, at least one optical memory, or a combination of at least two types of these memories. The semiconductor memory is, for example, a RAM or a ROM. The RAM is, for example, a static random access memory (SRAM) or a dynamic random access memory (DRAM). The ROM is, for example, an EEPROM. The storage unit 42 functions as, for example, a main storage device, an auxiliary storage device, or a cache memory. The storage unit 42 stores programs and data used for the operation of the terminal device 40 and data obtained by the operation of the terminal device 40. The information stored in the storage unit 42 may be updatable by, for example, information acquired from the network 50 via the communication unit 43.

The communication unit 43 includes at least one external communication interface connected to the network 50. The external communication interface may be either a wired communication or a wireless communication interface. For wired communication, the communication interface is, for example, a LAN interface or a USB. For wireless communication, the communication interface is, for example, an interface compatible with a mobile communication standard such as LTE, 4G or 5G, or an interface compatible with short-range wireless communication such as Bluetooth (registered trademark). The communication unit 43 receives data used for the operation of the terminal device 40, and transmits data obtained by the operation of the terminal device 40 to the outside (for example, the information processing device 10).

The input unit 44 includes at least one input interface. The input interface is, for example, a touch screen integrally provided with a physical key such as a keyboard, a capacitive key, a pointing device, and a display. The input interface may be, for example, a microphone that receives voice input, a camera that receives gesture input, or the like. The input unit 44 receives an input operation to enter data used for the operation of the terminal device 40. Instead of being provided in the terminal device 40, the input unit 44 may be connected to the terminal device 40 as an external input device.

The output unit 45 includes at least one output interface. The output interface is, for example, a display for outputting information in video, a speaker for outputting information in audio, or the like. The display is, for example, an LCD or an organic EL display. The output unit 45 displays and outputs data received from the information processing device 10, data obtained by the operation of the terminal device 40, and the like. Instead of being provided in the terminal device 40, the output unit 45 may be connected to the terminal device 40 as an external output device.

Embodiment of Delivery to the Housing Complex

Figure 5:
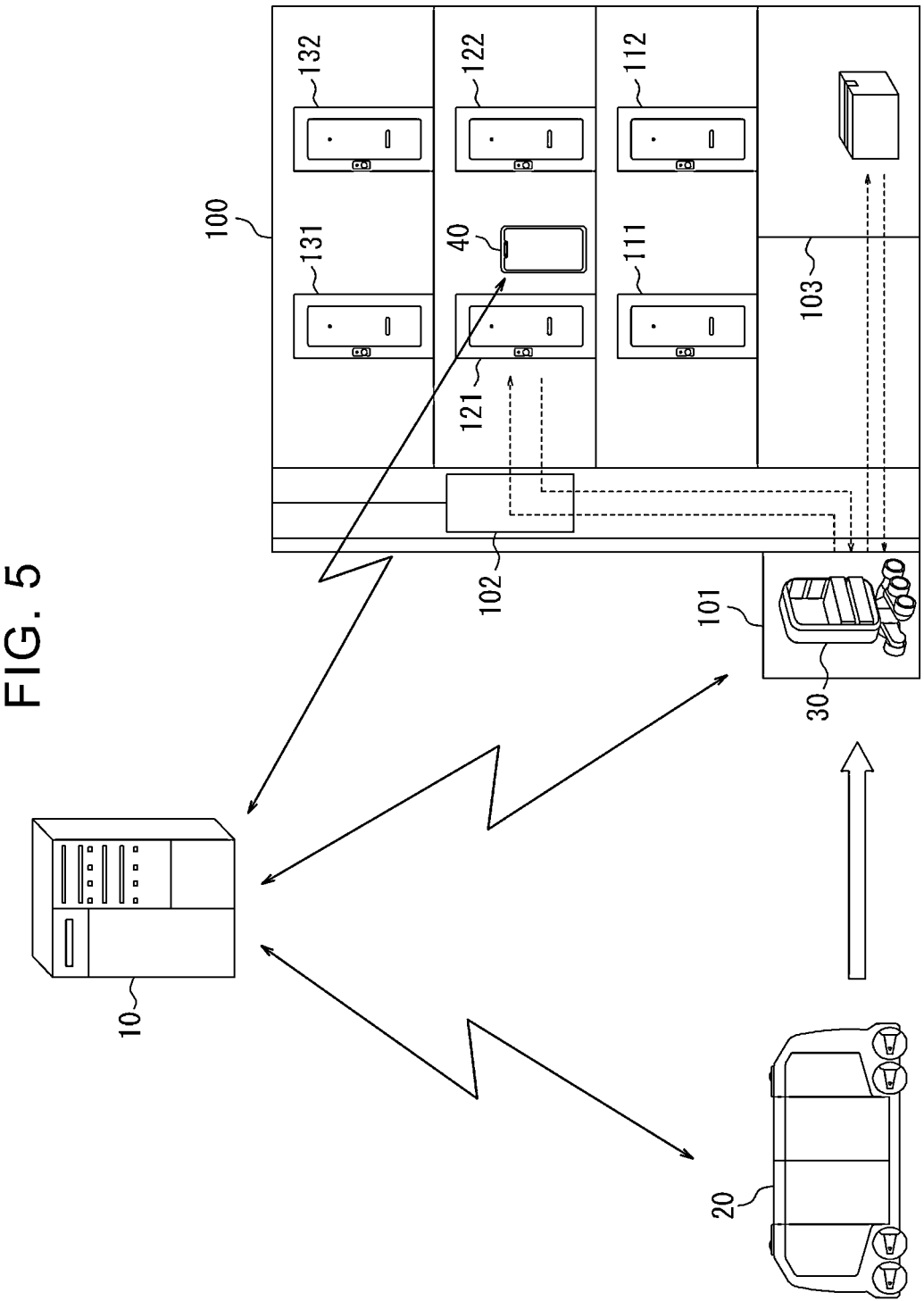
FIG. 5 is a conceptual diagram of delivery of a package by a system according to an embodiment of the present disclosure.

FIG. 5 is a conceptual diagram of delivery of a package to a final delivery destination by the delivery system 1 according to an embodiment of the present disclosure. FIG. 5 shows an embodiment in which a package is delivered to a door (a dwelling unit) in a housing complex (an apartment house, a condominium, or the like) by the delivery system 1 of FIG. 1. Hereinafter, a basic procedure of delivering the package to the recipient of the dwelling unit 121 in the housing complex 100 which is the final delivery destination will be described.

In FIG. 5, the housing complex 100 includes a plurality of dwelling units 111 to 132. Further, in the facility of the housing complex 100, a logistics robot (in-house logistics robot) 30 that delivers a package to each dwelling unit is permanently installed. The housing complex 100 includes a standby space 101 in which the logistics robot 30 stands by, an elevator 102 for the logistics robot 30 to move between floors, and a temporary storage space 103 for temporarily storing package.

The vehicle 20 loads a package to be delivered to the housing complex 100 (a package to be delivered to a recipient of the dwelling unit 121 and a package to be delivered to another dwelling unit in the housing complex 100), and moves to the housing complex 100. In addition, the vehicle 20 may load a package to a neighboring house that collectively delivers the package in addition to the package delivered to the housing complex 100. The vehicle 20 may be a manned vehicle or an arbitrary autonomous driving vehicle that travels unmanned.

The vehicle 20 transmits the delivery schedule information of the package to the housing complex 100 to the information processing device 10 in advance. The delivery schedule information includes package identification information for identifying a package, a delivery schedule time, which is a scheduled time at which the vehicle 20 delivers the package to the standby space 101 (intermediate delivery point), and information on the dwelling unit 121, which is a final delivery destination of the package in the housing complex 100. The vehicle 20 may transmit the delivery schedule information to the information processing device 10 at a stage where the delivery time is determined. Alternatively, the vehicle 20 may transmit the delivery schedule information including the expected delivery schedule time to the information processing device 10 in advance, and may transmit the information for updating the delivery schedule time when the delivery time is determined.

The information processing device 10 determines a logistics robot 30 that delivers a package. When there are a plurality of logistics robots 30, one logistics robot 30 selected from a plurality of logistics robots 30 is determined for one package. If the vehicle 20 is transporting a plurality of final delivery destination packages in the housing complex 100, one or more logistics robots 30 may be determined.

When determining the logistics robot 30 that delivers the package, the information processing device 10 acquires the authentication information of the logistics robot 30 from the storage unit 12. In the present embodiment, the authentication information is identification information (logistics robot ID) of the logistics robot 30. The identification information of the logistics robot 30 may be represented by, for example, an array of letters and numbers. The identification information of the logistics robot 30 is assigned to each logistics robot 30 in advance. The identification information of the logistics robot 30 may be periodically changed by the information processing device 10. The identification information of the logistics robot 30 is not disclosed to the outside.

The information processing device 10 transmits a package receipt instruction instructing receipt of a package to the logistics robot 30. The package receiving instruction includes information on a scheduled delivery time and a final delivery destination of the package. The package receiving instruction may include package identification information. Further, the information processing device 10 transmits the identification information (logistics robot ID) of the logistics robot 30 determined to deliver the package to the vehicles 20.

Figure 6:
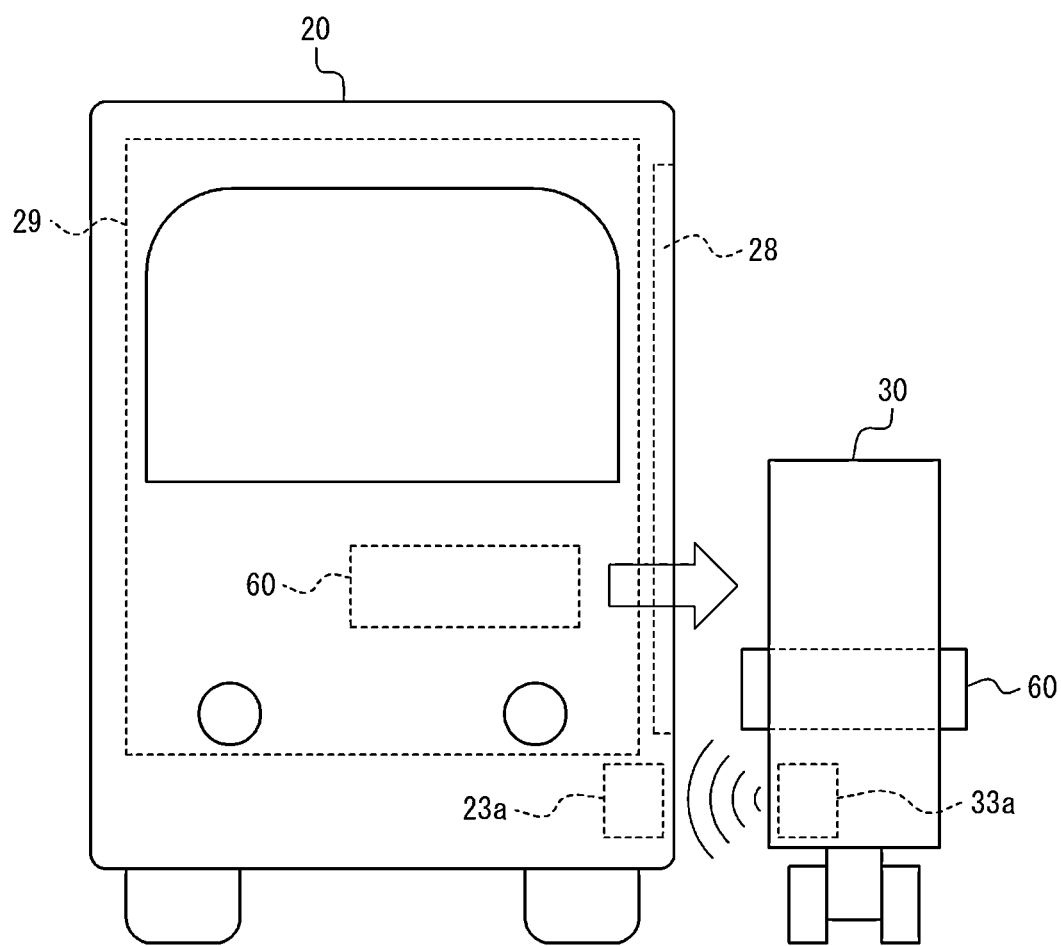
FIG. 6 is a diagram for explaining delivery of a package between a vehicle and a logistics robot.

When the vehicle 20 arrives in the standby space 101 of the housing complex 100, the identification information of the logistics robot 30 is acquired from the logistics robot (in-hall logistics robot) 30 which is standby in the standby space 101 which is an intermediate delivery point. For example, as illustrated in FIG. 6, the vehicles 20 and the logistics robots 30 each include a transceiver 23a and a 33a for short-range radio communication as a part of the communication units 23 and 33. The vehicles 20 and the logistics robots 30 stop at a position where mutual communication can be performed by the transceiver 23a, 33a.

The vehicle 20 collates the identification information of the logistics robot 30 received from the logistics robot 30 with the identification information of the logistics robot 30 received from the information processing device 10 in advance, and confirms that the logistics robot 30 is the genuine logistics robot 30 determined for delivery of the package 60. The vehicle 20 confirms that the identification information received from each of the information processing device 10 and the logistics robot 30 matches, thereby confirming that the logistics robot 30 is the logistics robot determined for the delivery of the package.

When the authenticity of the logistics robot 30 is confirmed, the vehicle 20 unlocks the door 28 of the luggage compartment 29 containing the package 60, and delivers the package 60 to be delivered to the logistics robot 30 in the housing complex 100. Delivery of the package 60 may be performed unattended by the drive unit 25 of the vehicle 20 and the drive unit 35 of the logistics robot 30, or the worker who has ridden on the vehicle 20 may move the package 60. The vehicle 20 can move to the next delivery location after delivering the package 60 to the logistics robot 30.

Next, the information processing device 10 inquires of the terminal device of the recipient of the final delivery destination of the package 60 whether or not the package 60 can be delivered. The recipient can respond to a voice or text inquiry displayed on the output unit 45 of the terminal device 40 using the input unit 44 of the terminal device 40. The information processing device 10 can cause the logistics robot 30 to deliver the package 60 in response to a response from the terminal device 40. For example, when the recipient desires to deliver the package 60 to the recipient's door, the logistics robot 30 moves to the recipient's door and delivers the package 60. Also, for example, if the recipient does not wish to deliver the package 60, or if there is no response due to a reason such as absence, the logistics robot 30 may transport the package 60 to the temporary storage space 103. When the logistics robot 30 delivers a plurality of packages 60, the information processing device may search for an optimum delivery route and instruct the logistics robot 30 to move according to the route.

The logistics robot 30 moves in the housing complex 100 in a self-propelled manner, and delivers the package 60 received from the vehicle 20 to each final delivery destination (for example, the dwelling unit 121). The logistics robot 30 delivers the package only to the recipient's door that has received a response enabling delivery from the terminal device 40. The delivery method may be a so-called placement in which the package is placed in front of the dwelling unit of the final delivery destination, but in a case where the logistics robot 30 includes the output unit 37, it is desirable to notify the recipient of the arrival of the package 60 directly to the recipient by voice or the like. The package 60 stored in the temporary storage space 103 may be delivered to the recipient's dwelling unit by the logistics robot 30 when the recipient becomes receivable. The temporary storage is not limited to the use of the temporary storage space 103, and may be performed in an arbitrary form (for example, held by the logistics robot 30 or the like).

When the delivery of the package to the recipient's dwelling unit is completed, the logistics robot 30 may transmit a delivery completion notification indicating the completion of the delivery of the package to the information processing device 10. The information processing device 10 receives a delivery completion notification from the logistics robot 30, and completes processing related to delivery of a series of packages. The outline of the delivery procedure of the package 60 to the dwelling unit in the housing complex 100 is as described above.

In the above embodiment, the specific area is described as an example of the housing complex, but the specific area is not limited to indoors. The specific area may be a housing complex in which a plurality of buildings are included in one site, and a residential area in a detached house forming one community.

Process Flow Between Components

Figure 7:
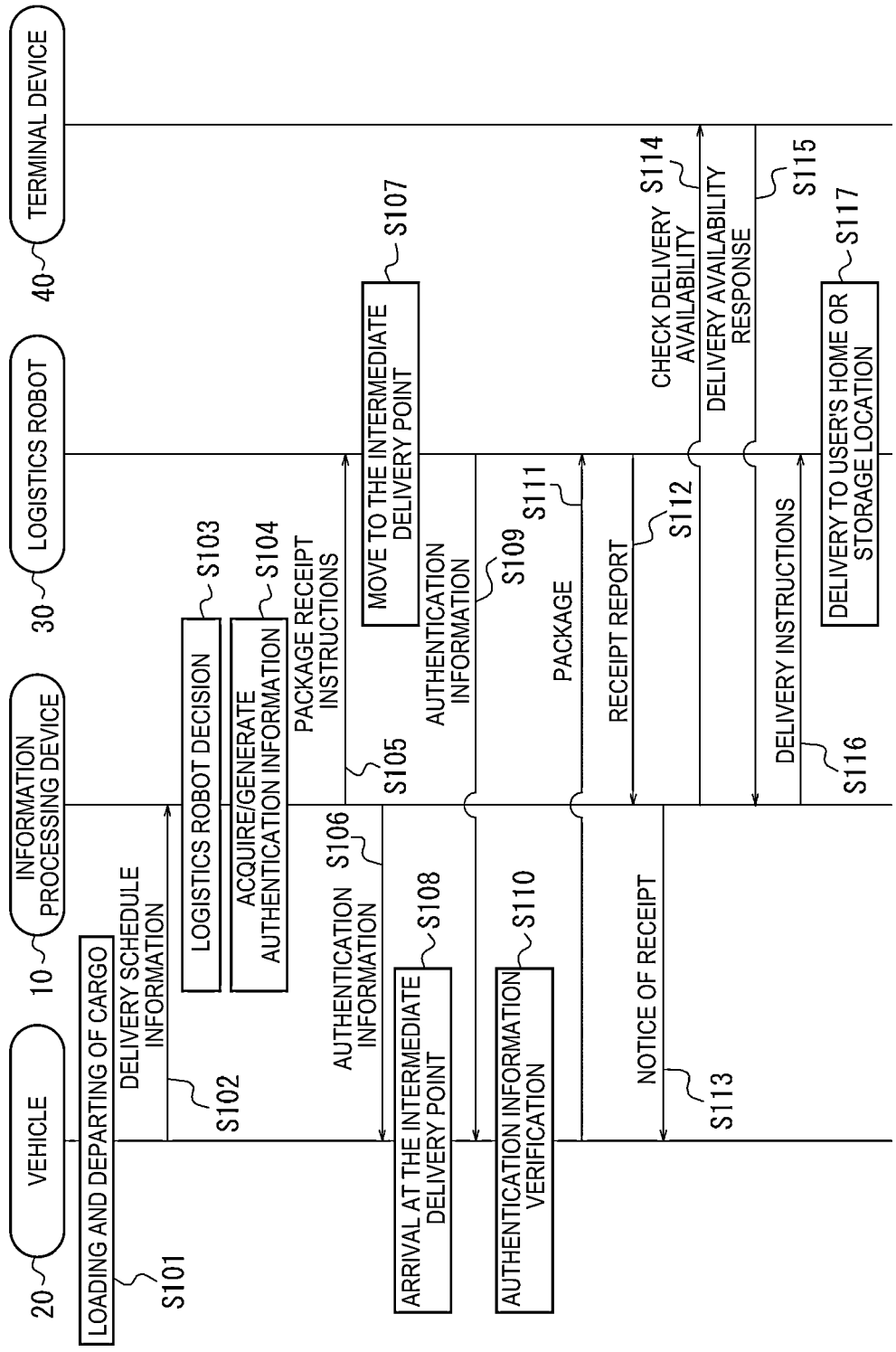
FIG. 7 is a sequence diagram for describing one embodiment of package delivery.

FIG. 7 is a sequence diagram for describing one embodiment of package delivery performed by the delivery system 1 of FIG. 1. The sequence diagram shown in FIG. 7 shows a flow of basic processing executed by each device of the delivery system 1.

S101: Vehicle 20 loads a package to be delivered. The loading operation may be performed manually, or the vehicle 20 may perform loading autonomously using the drive unit 25. It should be noted that the loading and unloading operation may be performed at the collection and delivery center of the parcel, or the parcel may be individually received from the delivery requester. After the loading is completed, the vehicle 20 departs and moves to the intermediate delivery point based on the instructed travel route.

S102: The control unit 21 of the vehicle 20 predicts the time required to arrive at the intermediate delivery point on the basis of information such as the current delivery state, for example, the number of places to stop before arriving at the intermediate delivery point, the scheduled travel distance, and the scheduled travel distance. The control unit 21 of the vehicle 20 transmits the delivery schedule information including the package identification information, the scheduled delivery time, and the final delivery destination to the information processing device 10 via the communication unit 23. The timing at which the vehicle 20 transmits the delivery schedule information to the information processing device 10 may be arbitrarily set. For example, the vehicle 20 may transmit the delivery schedule information about a predetermined time (e.g., 1 hour before) before arriving at the intermediate delivery point. Prior to S101, the vehicles 20 may transmit the delivery schedule information to the information processing device 10 based on the delivery plan of the day. The control unit 11 of the information processing device 10 receives the delivery schedule information via the communication unit 13.

S103: The control unit 11 of the information processing device 10 determines the logistics robot 30 to be delivered from the intermediate delivery point to the final delivery destination from the one or more logistics robots 30 with respect to the package that has received the delivery schedule information. When there is a plurality of logistics robots 30, the information processing device 10 may determine the logistics robots 30 to be allocated for the delivery of the package in consideration of the operation status, the operation schedule, the current position, and the like of the logistics robots 30.

S104: The information processing device 10 acquires, or newly generates, authentication information for confirming the authenticity of the logistics robots 30 from the storage unit 12. The authentication information may be identification information (logistics robot ID) given in advance for each logistics robot 30. The information processing device 10 may transmit an instruction for periodically or irregularly changing the identification information to the logistics robot 30 to rewrite the identification information stored in the storage unit 32 of the logistics robot 30. The information processing device 10 stores the identification information in the storage unit 12 of the own apparatus. The information processing device 10 may generate authentication information different from the identification information for identifying the respective logistics robots 30 for each delivery of the package. The information processing device 10 may arrange the authentication information in an irregular array of characters and numbers. By appropriately changing the authentication information, it is possible to further reduce the risk of the third party logistics robot being illegally delivered.

S105: The control unit 11 of the information processing device 10 transmits, to the logistics robot 30 via the communication unit 13, a package receiving instruction instructing receipt of a package. The package receiving instruction includes information on the scheduled delivery time and the final delivery destination of the package received from the vehicle 20 to the intermediate delivery point. The package receiving instruction may include package identification information. Further, when the information processing device 10 generates authentication information other than the identification information of the logistics robot 30 set in advance, the package receiving instruction may include the authentication information. The control unit 31 of the logistics robot 30 receives the package receiving instruction via the communication unit 33. The logistics robot 30 stores the scheduled delivery time, the final delivery destination, the package identification information, and the authentication information included in the received package receipt instruction in the storage unit 32.

S106: The control unit 11 of the information processing device 10 transmits the authentication information acquired or generated by S104 to the vehicles 20 via the communication unit 13. The control unit 21 of the vehicle 20 receives authentication information from the information processing device 10 via the communication unit 23. S105 and S106 may be executed before or after any other timing. Thus, the vehicle 20 and the logistics robot 30 have the same authentication information.

In accordance with the package receiving instruction received by S107:S105, the logistics robot 30 moves to the intermediate delivery point at or prior to the scheduled delivery time included in the package receiving instruction by the control unit 31 controlling the drive unit 35. In the example of FIG. 5, the intermediate delivery point is the standby space 101 of the logistics robot 30 in the housing complex 100.

S108: Vehicle 20 arrives at an intermediate delivery point when control unit 21 controls driver 25. The vehicle 20 arrives at the intermediate delivery point at a time close to the scheduled delivery time before and after the scheduled delivery time. In order not to delay the overall operation plan of the vehicle 20, it is preferable that the logistics robot 30 arrives at the intermediate delivery point before the vehicle 20. However, the vehicle 20 may arrive at the intermediate delivery point before the logistics robot 30.

S109: When the vehicle 20 arrives at the intermediate delivery point, the vehicle 20 and the logistics robot 30 at the intermediate delivery point stop at a position where they can communicate with each other and transfer the parcel. In this state, the control unit 31 of the logistics robot 30 transmits the authentication information to the vehicle 20 via the communication unit 33. The control unit 21 of the vehicle 20 receives the authentication information via the communication unit 23. The communication unit 23 of the vehicle 20 and the communication unit 33 of the logistics robot 30 may directly communicate with each other by short-range wireless communication means without passing through the network 50. The communication means between the logistics robot 30 and the vehicle 20 is not limited to the short-range wireless communication as long as the authentication information can be reliably received from the logistics robot 30 in which the vehicle 20 is located in close proximity.

S110: The control unit 21 of the vehicle 20 collates the authentication information received from the logistics robot 30 in S109 with the authentication information previously received from the information processing device 10 in S106. As a result, the vehicle 20 confirms that the logistics robot 30 is the logistics robot 30 allocated for the delivery of the package. When there is a plurality of logistics robots 30 at the intermediate delivery point, the control unit 21 of the vehicle 20 may repeat S109 and S110 until the authenticity can be confirmed, acquire the authentication information from the logistics robots 30 that differ in sequence, and check the authentication information.

In S110, the control unit 21 of the vehicle 20 may transmit the warning information to the information processing device 10 when the authenticity of the logistics robot 30 cannot be confirmed because the identification information of the logistics robot 30 is different from the identification information received from the information processing device 10. When the warning information is received from the vehicle 20, the information processing device 10 may transmit a signal for stopping all the logistics robots 30 to the logistics robot 30. Further, for example, in the case of the housing complex 100 illustrated in FIG. 5, the information processing device 10 may transmit information indicating an abnormality to the administrator of the housing complex 100. Thus, the administrator of the housing complex 100 can rush to the standby space 101 in order to confirm the situation. In addition, the administrator of the housing complex 100 can easily find the unauthorized logistics robot of the third party moving in this situation.

In S110, in addition to confirming the identity of the authentication information, the vehicle 20 may receive the package identification information from the logistics robot 30 and confirm that it matches the package identity of the package being delivered. When the package identification information matches, the vehicle 20 delivers the package to the logistics robot 30. When the package identification information does not match, the vehicle 20 does not need to deliver the package even when the authenticity of the logistics robot 30 can be confirmed based on the authentication information. Accordingly, even when the third-party logistics robot illegally obtains the authentication information, it is possible to further reduce the risk that the third-party logistics robot illegally receives the delivery of the package.

S111: When the authenticity of the logistics robot 30 is confirmed by S110, the control unit 21 of the vehicle 20 delivers the package to the logistics robot 30 using the drive unit 25 or manually. The control unit 31 of the logistics robot 30 receives the package from the vehicle 20 using the drive unit 35 or manually. At this time, as described with reference to FIG. 6, the door 28 of the luggage compartment 29 of the vehicle 20 may be unlocked, and the package may be handed over. Conversely, the package in the luggage compartment 29 of the vehicle 20 may not be transported out of the luggage compartment 29 unless the authenticity of the logistics robot 30 is confirmed by S110.

S112: When the receipt of the package is completed, the control unit 31 of the logistics robot 30 transmits a receipt report reporting the completion of the receipt to the information processing device 10 via the communication unit 33. The receipt report may include package identification information and receipt time information. The control unit 11 of the information processing device 10 receives the received information via the communication unit 13.

S113: When receiving the receipt report from the logistics robot 30, the control unit 11 of the information processing device 10 transmits a receipt notification indicating that the package 60 is certainly received to the vehicle 20. The control unit 21 of the vehicle 20 receives the reception notification via the communication unit 23. When the responsibility of the delivery company that delivers the package by the vehicle 20 is to deliver the package to the intermediate delivery point, the vehicle 20 can complete the delivery of the package by receiving the receipt notification by the vehicle 20. The vehicle may confirm that the receipt notification has been received and move to the next delivery location. If the vehicle 20 is managed by another device, the vehicle 20 may notify the other device that the delivery of the package has been completed.

S114: The control unit 11 of the information processing device 10 transmits, to the terminal device 40 of the recipient, which is the final delivery destination of the package, a delivery availability inquiry asking whether or not the package can be delivered via the communication unit 13. The control unit 41 of the terminal device 40 receives the delivery availability inquiry via the communication unit 43.

When the recipient responds to S115:S114 delivery availability inquiry via the terminal device 40, the control unit 41 of the terminal device 40 transmits the information of the response to the information processing device 10 as a delivery availability response via the communication unit 43. The control unit 11 of the information processing device 10 may receive a delivery availability response via the communication unit 13. The delivery availability response includes either information that is either deliverable or undeliverable. If the recipient is unable to receive the package at that time and therefore cannot be delivered, the delivery availability response may include a time at which the package can be received. When the recipient cannot respond to the delivery availability inquiry due to the absence or the like, the delivery availability response of S115 may not be transmitted.

S116: The control unit 11 of the information processing device 10 transmits a package delivery instruction to the logistics robot 30 via the communication unit 13 in response to a delivery availability reply from the terminal device 40 in S115. For example, when the control unit 11 receives a delivery availability response from the terminal device 40, the control unit 11 instructs the logistics robot 30 to deliver the package to the final delivery destination. In addition, when the control unit 11 receives a delivery availability response from the terminal device 40 indicating that delivery is impossible, the control unit 11 instructs the logistics robot 30 to deliver to the storage location. In this case, the recipient may go to the storage location to receive the package. When the control unit 11 acquires the delivery availability response including the information on the time that can be received from the terminal device 40, the control unit 11 instructs the logistics robot 30 to deliver to the storage location for temporary storage, determines the scheduled delivery time to the final delivery destination for subsequent delivery, and stores it in the storage unit 12. If the control unit 11 does not receive the delivery availability response from the terminal device 40, it instructs the logistics robot 30 to deliver to the storage location, and determines the time at which the inquiry is transmitted again to the terminal device 40 of the recipient and stores it in the storage unit 12.

S117: The control unit 31 of the logistics robot 30 delivers the package to the recipient's house or the temporary storage location as the final delivery destination in accordance with the delivery instruction received by S116. The logistics robot 30 may inform the information processing device 10 of completion of delivery of the cargo when the delivery of the cargo is completed at the final delivery destination. The control unit 11 of the information processing device 10 may store, in the storage unit 12, a history related to delivery and storage of a package.

In the sequential diagram of FIG. 7, S116 may be executed from S114 prior to S113. The information processing device 10 may transmit a delivery availability inquiry to the terminal device 40 at any timing from the time when the delivery schedule information of the package is received from the vehicles 20 in S102. In this case, the delivery availability query may include a scheduled time at which the package is delivered to the final delivery destination.

Although not included in the sequence diagram of FIG. 7, the logistics robot 30 may transmit the warning information to the information processing device 10 when the information on the scheduled time for receiving the package is received from the information processing device 10 and the scheduled time has elapsed for a predetermined time in a state where the package is not received from the vehicle 20 in the standby space 101. In this case, the information processing device 10 may inquire the vehicle 20 about the current position. When the vehicle 20 has finished delivering the package to the intermediate delivery point, the control unit 11 of the information processing device 10 can recognize at an early stage that an abnormality has occurred in the delivery of the package.

Embodiment in which the Delivery Company's Operation Management Server is Intervening In the embodiment of FIG. 1, the vehicle 20 directly transmits and receives information to and from the information processing device 10 that manages the delivery of the package in the specific area. In the embodiment illustrated in FIG. 8, the operation management server 70 that manages the operation of the vehicle 20 executes at least a part of the information processing and the communication performed by the vehicle 20. In this case, the vehicle 20 and the operation management server 70 are included in the vehicle-side system. The embodiment of FIG. 8 will be described below.

Figure 8:
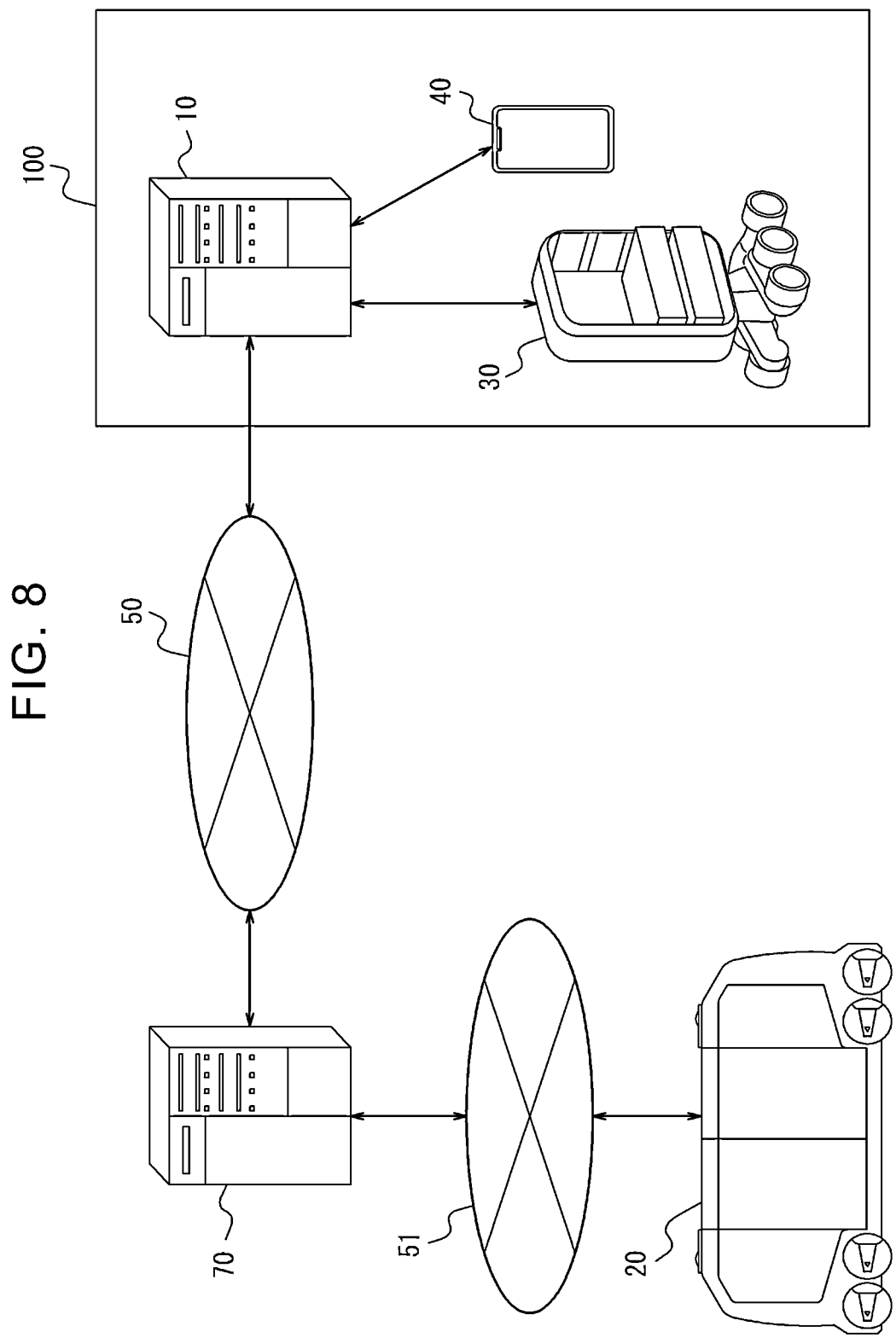
FIG. 8 is a block diagram illustrating a schematic configuration of a delivery system according to another embodiment of the present disclosure.

Similarly to the information processing device 10, the operation management server 70 includes components of a control unit, a storage unit, and a communication unit. The operation management server 70 manages operations of a plurality of vehicles 20 for package delivery belonging to a carrier. The vehicle 20 may share information such as the current position, the delivery status of the package, and the delivery route with the operation management server 70 in real time. In the example of FIG. 8, it is assumed that the vehicle 20 and the operation management server 70 are communicably connected by a dedicated network 51 for logistics management different from the network 50. The operation management server 70 is configured to be able to communicate with the information processing device 10 via a network 50 that provides a wide-area communication service. The dedicated network 51 may be the same network as the network 50.

On the other hand, in the example of FIG. 8, it is assumed that the information processing device 10 is disposed in the housing complex 100 (specific area) in addition to the logistics robot 30 and the terminal device 40. It is assumed that the information processing device 10, the logistics robot 30, and the terminal device 40 can communicate with each other by a communication unit other than the network 50 such as a private LAN.

The operation management server 70 executes many of the processes performed by the control unit 21, the storage unit 22, and the communication unit 23 of the vehicle 20 in the sequence diagram of FIG. 7. For example, the operation management server 70 transmits (S102) the delivery schedule information of the vehicles 20 to the information processing device 10 and receives (S106) the authentication information from the information processing device 10. In addition, the operation management server 70 acquires the authentication information received by the vehicles 20 from the logistics robots 30 in S109 via the dedicated network 51, and compares the authentication information with the authentication information acquired from the information processing device 10 (S110). Further, the operation management server 70 acquires, from the information processing device 10, the receipt notification after the delivery of the package is completed.

By doing so, the operation management server 70 can manage the delivery status of the packages of the plurality of vehicles 20 by a single apparatus. Further, by enhancing the security of communication between the information processing device 10 and the operation management server 70, the security of the delivery of the package is enhanced.

In the embodiment illustrated in FIG. 8, the information processing device of the housing complex 100 and the operation management server 70 of the delivery company exist separately. However, for example, in a case where the delivery company also contracts delivery of the package in the housing complex 100, the function of the information processing device 10 and the function of the operation management server 70 can be mounted on the same computer.

It should be noted that the present disclosure is not limited to the above-described embodiments, and many modifications and variations are possible. For example, the functions included in each means, each step, etc. can be rearranged so as not to be logically inconsistent, and a plurality of means, steps, etc. can be combined into one or divided.

A part of the embodiment of the present disclosure is shown as an example below. However, it should be noted that embodiment of the present disclosure is not limited to these.

Appendix 1

An information processing device is included in a delivery system in which a package delivered to an intermediate delivery point in a specific area is delivered to a final delivery destination in the specific area, and includes a control unit that executes processes to determine the logistics robot that delivers the package from the intermediate delivery point to the final delivery destination, acquire or generate authentication information for confirming authenticity of the logistics robot and that is used when the logistics robot receives the package from a vehicle that delivers the package to the intermediate delivery point, and transmit the authentication information to a vehicle-side system of the vehicle before the logistics robot receives the package.

Appendix 2

In the information processing device according to Appendix 1, the authentication information is identification information assigned to the logistics robot.

Appendix 3

In the information processing device according to Appendix 2, the control unit is configured to transmit an instruction to change the identification information periodically or irregularly to the logistics robot.

Appendix 4

In the information processing device according to any one of appendices 1 to 3, the control unit manages an operation of the logistics robot in the specific area.

Appendix 5

In the information processing device according to any one of appendices 1 to 4, the specific area includes any one of a housing complex, a residential area, an office building, a hospital, a factory, and a school.

Appendix 6

In the information processing device according to any one of appendices 1 to 5, the control unit determines the logistics robot that delivers the package when package identification information for identifying the package, a scheduled time at which the vehicle delivers the package, and information on the final delivery destination of the package are received.

Appendix 7

In the information processing device according to Appendix 6, the control unit is configured to transmit the package identification information to the logistics robot.

Appendix 8

In the information processing device according to any one of appendices 1 to 7, the control unit is configured to receive a receipt report of the package from the logistics robot when the logistics robot receives the package at the intermediate delivery point.

Appendix 9

In the information processing device according to Appendix 8, the control unit transmits a receipt notification to the vehicle-side system when the receipt report is received.

Appendix 10

In the information processing device according to any one of appendices 1 to 9, the control unit is configured to be able to receive warning information indicating that the vehicle is unable to confirm the authenticity of the logistics robot.

Appendix 11

In the information processing device according to Appendix 10, the control unit is configured to transmit a signal for stopping the logistics robots when the warning information is received.

Appendix 12

A delivery system in which a package delivered to an intermediate delivery point in a specific area is delivered to a final delivery destination in the specific area includes: a vehicle that delivers the package to the intermediate delivery point; a logistics robot; and an information processing device, and the information processing device includes a control unit that executes processes to determine the logistics robot that delivers the package from the intermediate delivery point to the final delivery destination, acquire or generate authentication information for confirming authenticity of the logistics robot and that is used when the logistics robot receives the package from the vehicle that delivers the package to the intermediate delivery point, and transmit the authentication information to a vehicle-side system of the vehicle before the logistics robot receives the package.

Appendix 13

In the delivery system according to Appendix 12, the vehicle-side system acquires the authentication information through communication with the logistics robot at the intermediate delivery point, and hands over the package to the logistics robot when the authenticity of the logistics robot is able to be confirmed.

Appendix 14

In the delivery system according to Appendix 13, when the authenticity of the logistics robot is unable to be confirmed, the vehicle-side system transmits warning information to the information processing device directly or indirectly.

Appendix 15

In the delivery system according to Appendix 13 or 14, the vehicle includes a luggage compartment that stores the package, and the luggage compartment is unlocked when the authenticity of the logistics robot is able to be confirmed.

Appendix 16

In the delivery system according to any one of appendices 12 to 15, package identification information is allocated to the package, and the vehicle-side system hands over the package to the logistics robot when the package identification information allocated to the package is able to be acquired from the logistics robot, in addition to that the authenticity of the logistics robot is able to be confirmed.

Appendix 17

In the delivery system according to any one of appendices 12 to 15, the logistics robot transmits warning information to the information processing device when a scheduled time to receive the package is received from the information processing device and a predetermined time elapses from the scheduled time in a state where the logistics robot does not receive the package from the vehicle at the intermediate delivery point.

Appendix 18

An information processing method executed by a control unit of an information processing device included in a delivery system in which a package delivered to an intermediate delivery point in a specific area is delivered to a final delivery destination in the specific area includes: a process of determining a logistics robot that delivers the package from the intermediate delivery point to the final delivery destination; a process of acquiring or generating authentication information for confirming authenticity of the logistics robot and that is used when the logistics robot receives the package from a vehicle that delivers the package to the intermediate delivery point; and a process of transmitting the authentication information to a vehicle-side system of the vehicle before the logistics robot receives the package.

Appendix 19

In the information processing method according to Appendix 18, the process of determining the logistics robot is executed when package identification information for identifying the package, a scheduled time at which the vehicle delivers the package, and information on the final delivery destination of the package are received.

Appendix 20

The information processing method according to Appendix 18 or 19 further includes a process of receiving a receipt report of the package from the logistics robot when the logistics robot receives the package at the intermediate delivery point after the process of transmitting the authentication information to the vehicle-side system.

What is claimed is:
1. An information processing device included in a delivery system in which a package delivered to an intermediate delivery point in a specific area is further delivered to a final delivery destination in the specific area, the information processing device comprising a control unit configured to:
automatically determine a logistics robot that delivers the package from the intermediate delivery point to the final delivery destination;
automatically acquire or generate authentication information for automatically confirming authenticity of the logistics robot, the authentication information being automatically used when the logistics robot receives the package from a vehicle that delivers the package to the intermediate delivery point to automatically confirm the authenticity of the logistics robot, the authenticity of the logistics robot indicating that the logistics robot is a correct logistics robot determined for delivering the package;
automatically transmit the authentication information to a vehicle-side system of the vehicle before the logistics robot receives the package;
in response to the authenticity of the logistics robot being not confirmed, automatically receive warning informa- tion indicating that the vehicle is unable to confirm the authenticity of the logistics robot; and in response to the warning information being received,
automatically transmit a signal to the logistics robot for stopping the logistics robot, and
automatically control the vehicle not to deliver the package to the logistics robot whose authenticity is not confirmed.

2. The information processing device according to claim 1, wherein the authentication information is identification information assigned to the logistics robot.

3. The information processing device according to claim 2, wherein the control unit is configured to automatically transmit an instruction to change the identification information periodically or irregularly to the logistics robot.

4. The information processing device according to claim 1, wherein the control unit is configured to automatically control an operation of the logistics robot in the specific area.

5. The information processing device according to claim 1, wherein the specific area includes any one of a housing complex, a residential area, an office building, a hospital, a factory, or a school.

6. The information processing device according to claim 1, wherein the control unit is configured to automatically determine the logistics robot that delivers the package in response to receipt of:
package identification information for identifying the package,
a scheduled time at which the vehicle delivers the package, and
information on the final delivery destination of the package.

7. The information processing device according to claim 6, wherein the control unit is configured to automatically transmit the package identification information to the logistics robot.

8. The information processing device according to claim 1, wherein the control unit is configured to automatically receive a receipt report of the package from the logistics robot in response to the logistics robot receiving the package at the intermediate delivery point.

9. The information processing device according to claim 8, wherein the control unit is configured to automatically transmit a receipt notification to the vehicle-side system in response to the receipt report being received.

10. A delivery system in which a package delivered to an intermediate delivery point in a specific area is further delivered to a final delivery destination in the specific area, the delivery system comprising:
a vehicle configured to deliver the package to the intermediate delivery point;
a logistics robot; and
an information processing device,
wherein
the information processing device includes a control unit configured to:
automatically determine the logistics robot that delivers the package from the intermediate delivery point to the final delivery destination;
automatically acquire or generate authentication information for automatically confirming authenticity of the logistics robot, the authentication information being automatically used when the logistics robot receives the package from the vehicle that delivers the package to the intermediate delivery point to automatically confirm the authenticity of the logistics robot, the authenticity of the logistics robot indicating that the logistics robot is a correct logistics robot determined for delivering the package;
automatically transmit the authentication information to a vehicle-side system of the vehicle that delivers the package to the intermediate delivery point before the logistics robot receives the package;
in response to the authenticity of the logistics robot being not confirmed, automatically receive warning information indicating that the vehicle is unable to confirm the authenticity of the logistics robot; and
in response to the warning information being received,
automatically transmit a signal to the logistics robot for stopping the logistics robot, and
automatically control the vehicle not to deliver the package to the logistics robot whose authenticity is not confirmed.

11. The delivery system according to claim 10, wherein the vehicle-side system is configured to
automatically acquire the authentication information through communication with the logistics robot at the intermediate delivery point, and
automatically hand over the package to the logistics robot in response to the authenticity of the logistics robot being confirmed.

12. The delivery system according to claim 11, wherein in response to the authenticity of the logistics robot being not confirmed, the vehicle-side system is configured to automatically transmit the warning information to the control unit of the information processing device directly or indirectly.

13. The delivery system according to claim 11, wherein:
the vehicle includes a luggage compartment that stores the package; and
the luggage compartment is unlocked in response to the authenticity of the logistics robot being confirmed.

14. The delivery system according to claim 10, wherein:
package identification information is allocated to the package; and
the vehicle-side system is configured to automatically hand over the package to the logistics robot in response to the package identification information allocated to the package being acquired from the logistics robot and the authenticity of the logistics robot being confirmed.

15. The delivery system according to claim 10, wherein the logistics robot is configured to transmit further warning information to the control unit of the information processing device in response to a scheduled time to receive the package being received from the information processing device and a predetermined time elapsing from the scheduled time in a state where the logistics robot does not receive the package from the vehicle at the intermediate delivery point.

16. An information processing method executed by a control unit of an information processing device included in a delivery system in which a package delivered to an intermediate delivery point in a specific area is further delivered to a final delivery destination in the specific area, the information processing method comprising:
automatically determining a logistics robot that delivers the package from the intermediate delivery point to the final delivery destination;
automatically acquiring or generating authentication information for automatically confirming authenticity of the logistics robot, the authentication information being automatically used when the logistics robot receives the package from a vehicle that delivers the package to the intermediate delivery point to automatically confirm the authenticity of the logistics robot, the authenticity of the logistics robot indicating that the logistics robot is a correct logistics robot determined for delivering the package; and automatically transmitting the authentication information to a vehicle-side system of the vehicle before the logistics robot receives the package;

in response to the authenticity of the logistics robot being not confirmed, automatically receiving warning information indicating that the vehicle is unable to confirm the authenticity of the logistics robot; and in response to the warning information being received,
automatically transmitting a signal to the logistics robot for stopping the logistics robot, and
automatically controlling the vehicle not to deliver the package to the logistics robot whose authenticity is not confirmed.

17. The information processing method according to claim 16, wherein the automatically determining the logistics robot is executed in response to package identification information for identifying the package, a scheduled time at which the vehicle delivers the package, and information on the final delivery destination of the package being received.

18. The information processing method according to claim 16, further comprising automatically receiving a receipt report of the package from the logistics robot in response to the logistics robot receiving the package at the intermediate delivery point after the authentication information is automatically transmitted to the vehicle-side system.

* * * * *